(12) United States Patent
McKenna et al.

(10) Patent No.: US 6,408,180 B1
(45) Date of Patent: Jun. 18, 2002

(54) UBIQUITOUS MOBILE SUBSCRIBER STATION

(75) Inventors: Daniel B. McKenna, Broomfield; Scott P. Gregoire, Louisville; Jerry H. Polson, Longmont, all of CO (US)

(73) Assignee: AirCell, Inc., Louisville, CO (US)

( * ) Notice: Subject to any disclaimer, the term of this patent is extended or adjusted under 35 U.S.C. 154(b) by 0 days.

(21) Appl. No.: 09/379,825

(22) Filed: Aug. 24, 1999

Related U.S. Application Data

(63) Continuation-in-part of application No. 08/960,183, filed on Oct. 29, 1997, which is a continuation-in-part of application No. 08/027,333, filed on Mar. 8, 1993, now Pat. No. 5,444,762, which is a continuation-in-part of application No. 07/847,920, filed on Mar. 6, 1992, now Pat. No. 5,557,656.

(51) Int. Cl.$^7$ .................................................. H04Q 7/20
(52) U.S. Cl. ...................... 455/431; 455/430; 455/456; 455/552; 455/562; 455/440
(58) Field of Search ................................ 455/431, 430, 455/427, 428, 562, 456, 436, 12.1, 440, 63, 447, 552, 553

(56) References Cited

U.S. PATENT DOCUMENTS

| | | | |
|---|---|---|---|
| 4,816,828 A | | 3/1989 | Feher |
| 5,235,633 A | * | 8/1993 | Dennison et al. ............. 379/60 |
| 5,394,561 A | * | 2/1995 | Freeburg .................... 455/13.1 |
| 5,408,515 A | * | 4/1995 | Bhagat et al. ................ 379/59 |
| 5,444,762 A | * | 8/1995 | Frey et al. .................... 379/58 |
| 5,519,761 A | | 5/1996 | Gilhousen |
| 5,832,379 A | * | 11/1998 | Mallinckrodt ............... 455/427 |
| 6,018,659 A | * | 1/2000 | Ayyagari et al. ............. 455/431 |
| 6,208,834 B1 | * | 3/2001 | Tawil et al. .................. 455/3.2 |

FOREIGN PATENT DOCUMENTS

| | | |
|---|---|---|
| EP | 757453 | 2/1997 |
| GB | 2327016 | 1/1999 |
| JP | 06315005 | 11/1994 |
| WO | WO98/26521 | 6/1998 |
| WO | WO98/29957 | 7/1998 |
| WO | WO99/22465 | 5/1999 |
| WO | WO99/40749 | 8/1999 |

OTHER PUBLICATIONS

G. D'Aria et al., "Terrestrial Flight Telephone System: Integration Issues for a Pan–European Network," Proceedings of the Nordic Seminar On Digital Mobile Radio Communications, Seminar 5, pp. 123–130, (Dec. 1, 1992).

* cited by examiner

Primary Examiner—Daniel Hunter
Assistant Examiner—Lana Le
(74) Attorney, Agent, or Firm—Patton Boggs LLP

(57) ABSTRACT

The ubiquitous mobile subscriber station of the present invention enables the subscriber to receive wireless cellular mobile telecommunication services in a unified manner in both the terrestrial (ground-based) and non-terrestrial regions. The ubiquitous mobile subscriber station extends the usage of existing cellular mobile telecommunication frequencies allocated for ground-based cellular communications to non-terrestrial cellular communications in a manner that avoids the possibility of signal interference between the ground-based and non-terrestrial mobile subscriber stations. In particular, the ubiquitous mobile subscriber station automatically transitions between the communications paradigm used in ground-based cellular communications and the communications paradigm used in non-terrestrial cellular communications as a function of the present location of the ubiquitous mobile subscriber station. The subscriber therefore can use the ubiquitous mobile subscriber station in all locations for uninterrupted wireless communications services. In addition, the non-terrestrial capabilities of the ubiquitous mobile subscriber station can be used to implement data transmission capabilities for use in the aircraft to provide Flight Information Services, real time monitoring of aircraft operation, as well as enhanced data communication services for the passengers in the aircraft.

34 Claims, 7 Drawing Sheets

UBIQUITOUS MOBILE SUBSCRIBER STATION

Cross-REFERENCE TO RELATED APPLICATIONS

This application is a continuation in part of U.S. patent application Ser. No. 08/960,183, filed Oct. 22, 1997 and titled "Non-terrestrial Cellular Mobile Telecommunication Station", which is a continuation-in-part of U.S. patent application Ser. No. 08/027,333 filed Mar. 08, 1993 of U.S. Pat. No. 5,444,762, titled "Method and Apparatus for Reducing Interference Among Cellular Telephone Signals" and U.S. patent application Ser. No. 07/847,920 filed on Mar. 06, 1992, U.S. Pat. No. 5,557,656, titled "Mobile Telecommunications".

FIELD OF THE INVENTION

This invention relates to cellular communications and, in particular, to a mobile subscriber station that provides wireless telecommunication services in both the terrestrial (ground-based) and non-terrestrial regions.

Problem

It is a problem in the field of cellular mobile telecommunication services to provide customers with high quality communication services in a unified manner via a wireless communication medium. Existing cellular mobile telecommunication systems serve terrestrial (termed ground-based herein) mobile subscriber stations, but this service was traditionally not extensible to non-terrestrial mobile subscriber stations due to signal interference problems between ground-based and non-terrestrial mobile subscriber stations. The above-noted U.S. Patents disclose a non-terrestrial mobile telecommunication system and a mobile subscriber station operable in such a system, which provides subscribers with cellular mobile telecommunication services in the non-terrestrial region. However, the mobile subscriber stations used in the ground-based cellular mobile telecommunication system and the mobile subscriber stations used in the non-terrestrial cellular mobile telecommunication system are architected to operate in only their associated cellular mobile telecommunication system.

Thus, the existing mobile subscriber stations are incapable of being used both in ground-based cellular mobile telecommunication systems and non-terrestrial cellular mobile telecommunication systems. Therefore, subscribers must presently use one mobile subscriber station for the ground-based cellular mobile telecommunication system and another mobile subscriber station for the non-terrestrial cellular mobile telecommunication system. Each of these mobile subscriber stations has an assigned telephone number and the communication services provided to the subscriber are therefore disjunct. There is presently no mobile subscriber station or cellular mobile telecommunication system that enables the subscriber to receive wireless cellular mobile telecommunication services in a unified manner in both the terrestrial (ground-based) and non-terrestrial regions.

Solution

The above described problems are solved and a technical advance achieved in the field by the ubiquitous mobile subscriber station of the present invention which enables the subscriber to receive wireless cellular mobile telecommunication services in a unified manner in both the terrestrial (ground-based) and non-terrestrial regions. The ubiquitous mobile subscriber station extends the usage of existing cellular mobile telecommunication frequencies allocated for ground-based cellular communications to non-terrestrial cellular communications in a manner that avoids the possibility of signal interference between the ground-based and non-terrestrial mobile subscriber stations. In particular, the ubiquitous mobile subscriber station automatically transitions between the communications paradigm used in ground-based cellular communications and the communications paradigm used in non-terrestrial cellular communications as a function of the present location of the ubiquitous mobile subscriber station. The subscriber therefore can use the ubiquitous mobile subscriber station in all locations for uninterrupted wireless communications services. In addition, the non-terrestrial capabilities of the ubiquitous mobile subscriber station can be used to implement data transmission capabilities for use in the aircraft to provide Flight Information Services, real time monitoring of aircraft operation, as well as enhanced data communication services for the passengers in the aircraft.

The multi-dimensional cellular telecommunication network is seamless and the existing ground-based cell site transmitter/receiver antenna installations can be used to serve non-terrestrial mobile subscriber stations by the addition of non-terrestrial antenna elements. These non-terrestrial antenna elements create an antenna pattern which is insensitive to the reception of ground-originating or ground reflected signals and which antenna pattern is transmissive only in a skyward direction. In addition, the polarization of the signals produced by the non-terrestrial antenna elements is a polarization that is different than and preferably substantially orthogonal to the polarization of the ground-based cellular radio signals, such as a horizontal polarization, to thereby minimize the possibility of interference with the vertically polarized ground-based cellular radio signals. Furthermore, the control signals exchanged between the non-terrestrial mobile subscriber stations and the non-terrestrial cell site controller are architected to avoid the possibility of interference with ground-based cell site transmitter-receiver pairs. In particular, the control channels used for the non-terrestrial mobile subscriber stations are selected such that the control signals transmitted in these channels are unrecognizable to the ground-based mobile subscriber stations and ground-based cell site transmitter-receiver pairs so that even if broadcasts from a non-terrestrial mobile subscriber station reach a ground-based mobile subscriber station or cell site transmitter-receiver pair they cannot be interpreted and are rejected out of hand. Optionally, the non-terrestrial system can switch uplink and downlink frequencies to be the opposite of ground-based mobile subscriber station pattern. In this manner, non-terrestrial cells can be created in the region of space adjacent to and overlying the existing ground-based cells and the existing cellular communication frequencies allocated for ground-based cellular telecommunications can be reused for non-terrestrial cellular telecommunications without the possibility of interaction between the existing ground-based cellular mobile telecommunication system and the non-terrestrial mobile subscriber stations. To the mobile telecommunication switching office, the non-terrestrial cells all operate in harmony with the existing ground-based cell sites with no discernible differentiation among cells or stations, be they ground-based or non-terrestrial in nature. In this manner, the existing two dimension mobile cellular telecommunication network is extensible to create a multi-dimensional cellular mobile telecommunication system which makes use of the presently allocated cellular radio frequencies and presently provided services. In this environment, the ubiquitous mobile subscriber station automatically transitions between the communications paradigm used in ground-based cellular communications and the communications paradigm used in non-terrestrial cellular communications as a function of the present location of the ubiquitous mobile subscriber station. In addition, the non-terrestrial capabilities of the ubiquitous mobile subscriber station can be used to implement data transmission capabilities for use both in the aircraft to provide Flight Information Services, real time monitoring of aircraft operation, as well as to provide enhanced data communication services for the passengers in the aircraft. This data communications capability can be used to link the aircraft to a private data communication network as well as providing access to public data communication networks. Thus, the subscriber who is equipped with a ubiquitous mobile subscriber station can maintain a single set of identification data (MIN, ESN) regardless of their location in the multi-dimensional cellular mobile telecommunication system and independent of the mode of operation: ground-based cellular communications or non-terrestrial cellular communications

DETAILED DESCRIPTION

Figure 1:
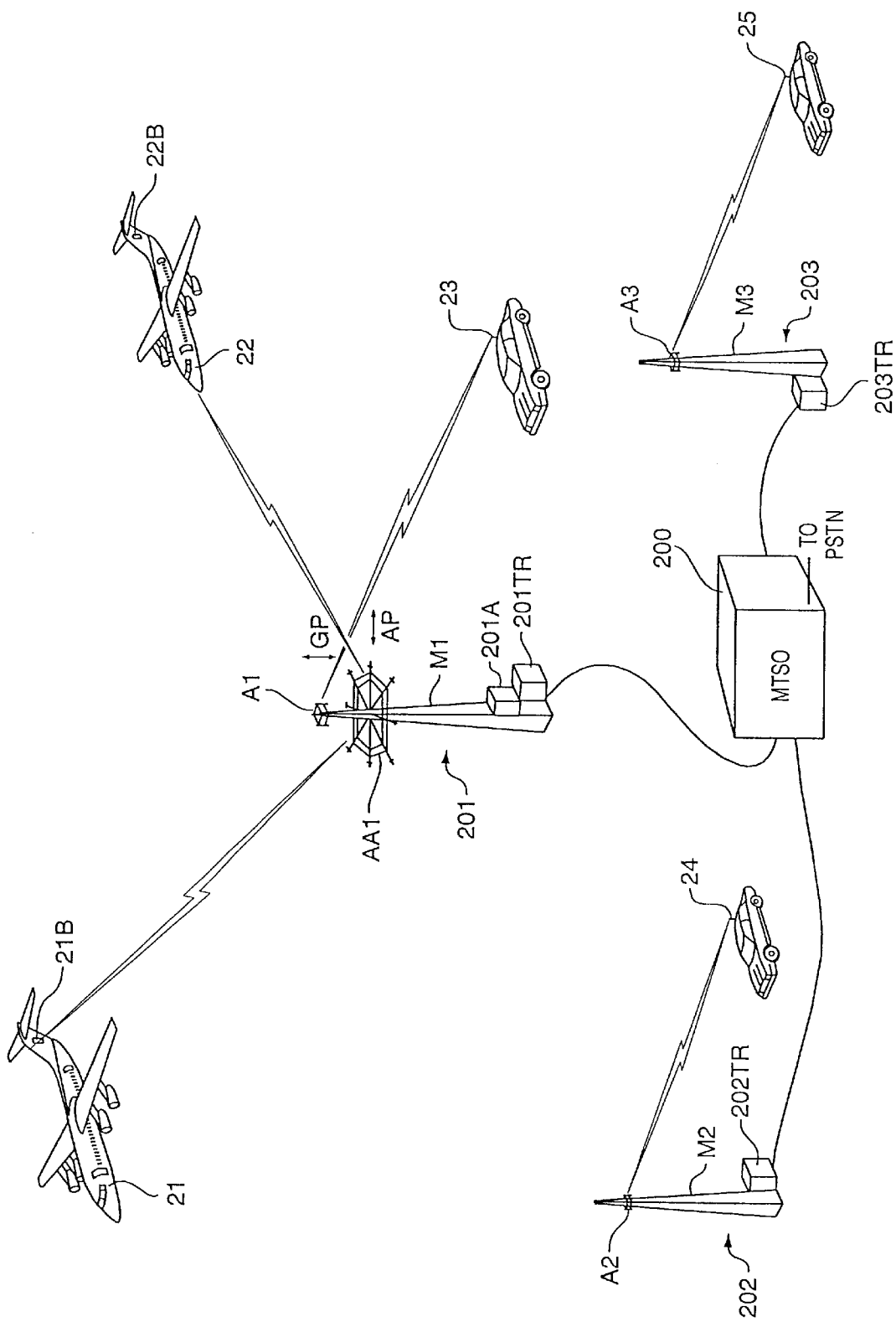
FIG. 1 illustrates, in block diagram form, the overall architecture of a multi-dimensional cellular mobile telecommunication network.

Cellular mobile telecommunication systems provide the service of connecting mobile telecommunication customers, each having a mobile subscriber station, to both land-based customers who are served by the common carrier public telephone network as well as other mobile telecommunication customers. In such a system, all incoming and outgoing calls are routed through mobile telecommunication switching offices (MTSO), each of which is connected to a plurality of cell sites (base stations) which communicate with mobile subscriber stations located in the area covered by the cell sites. The mobile subscriber stations are served by the cell sites, each of which is located in one cell area of a larger service region. Each cell site in the service region is connected by a group of communication links to the mobile telecommunication switching office. Each cell site contains a group of radio transmitters and receivers with each transmitter-receiver pair being connected to one communication link. Each transmitter-receiver pair operates on a pair of radio frequencies: one frequency to transmit radio signals to the mobile subscriber station and the other frequency to receive radio signals from the mobile subscriber station. The first stage of a cellular communication connection is set up when a transmitter-receiver pair in a cell site, operating on a predetermined pair of radio frequencies, is turned on and a mobile subscriber station, located in the cell site, is tuned to the same pair of radio frequencies. The second stage of the communication connection is between the communication link connected to this transmitter-receiver pair and the common carrier public telephone network. This second stage of the communication connection is set up in the mobile telecommunication switching office, which is connected to the common carrier public telephone network by incoming and outgoing trunks. The mobile telecommunication switching office contains a switching network to switch mobile customer voice and/or data signals from the communication link to an incoming or outgoing trunk. The mobile telecommunication system is controlled by a mobile telecommunication controller at the mobile telecommunication switching office and a cell site controller at each cell site associated with the mobile telecommunication switching office. A plurality of data links connect the mobile telecommunication controller and the associated cell site controllers. The mobile telecommunication controller operates under control of complex software and controls the switching network. The mobile telecommunication controller also controls the actions of the associated cell site controllers by generating and interpreting the control messages that are exchanged with the associated cell site controllers over the data links. The cell site controllers at each cell site, in response to control messages from the mobile telephone switching office, control the transmitter-receiver pairs at the cell site. The control processes at each cell site also control the tuning of the mobile subscriber stations to the selected radio frequencies.

Each cell in the ground-based cellular mobile telecommunication network comprises a predetermined volume of space radially arranged around the cell site transmitting antenna with the region of space roughly approximating a cylindrical volume having limited height. Since all of the mobile subscriber stations are installed in ground-based units (such as motor vehicles or handheld units) in traditional cellular mobile telecommunication systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. When a ground-based mobile subscriber station initiates a call connection, control signals from the local cell site transmitter cause the frequency agile transponder in the ground-based mobile subscriber station to operate at the frequency of operation designated for that particular cell site. As the ground-based mobile subscriber station moves from one cell site to another, the call connection is handed off to the successive cell sites and the frequency agile transponder in the ground-based mobile subscriber station adjusts its frequency of operation to correspond to the frequency of operation of the transmitter located in the cell site in which the ground-based mobile subscriber station is presently operational.

There are numerous technologies that can be used to implement the cellular mobile telecommunication system and these include both digital and analog paradigms, with the digital apparatus representing the more recent of the two technologies. Furthermore, the frequency spectrum is allocated for different cellular communication systems, with the personal communication system (PCS) systems being located in the 1.9 GHz region of the spectrum while traditional cellular systems are located in the 800 MHZ region of the spectrum. The access methods used in cellular communication systems include Code Division Multiple Access that uses orthogonal codes to implement communication channels, Time Division Multiple Access which uses time division multiplexing of a frequency to implement communication channels and Frequency Division Multiple Access which uses separate frequencies to implement communication channels, as well as combinations of these technologies. These concepts are well known in the field of cellular communications and various ones of these can be used to implement the ubiquitous mobile subscriber station of the present invention. These technologies are not limitations to the system which is described herein, since a novel system concept is disclosed, not a specific technologically limited implementation of an existing system concept.

This existing cellular mobile telecommunication system is presently in widespread use and has been designed to eliminate the problem of frequency overlap among adjacent cell sites and to minimize the number of frequencies required to serve vast areas without encountering the possibility of frequency overlap. These existing cellular mobile telecommunication systems, however, are inoperable when the user's mobile subscriber station is non-terrestrial in nature. In particular, the provision of cellular mobile telecommunication services to aircraft is inconsistent with the architecture of the existing ground-based cellular mobile telecommunication network since the antenna pattern of the existing ground-based cellular mobile telecommunication system broadcasts a signal in a pattern proximate to the ground and the pattern of frequency allocation for the pattern of cell sites is not extensible to aircraft. In particular, an antenna pattern that would be capable of serving a fast moving aircraft would have to cover a sufficient volume of space to minimize the number of station hand offs as the aircraft traverses one cell site after another. For the non-terrestrial mobile subscriber station to have an adequate sized cell site, that cell site would span a large number of the existing ground-based cell sites. Therefore, the existing pattern of frequency reuse would be disrupted and there presently is no frequency allocated or available for allocation to such purpose. If additional frequencies were allocated for non-terrestrial cellular telecommunication systems, all existing cellular telecommunication equipment would have to be redesigned to be capable of operating at these new frequencies and yet remain compatible with the existing pattern of cellular telecommunication services. Existing cellular mobile telecommunication systems serve terrestrial (termed ground-based herein) mobile subscriber stations, but this service is not presently extensible to non-terrestrial mobile subscriber stations due to signal interference problems between ground-based and non-terrestrial mobile subscriber stations.

The multi-dimensional cellular mobile telecommunication system noted above extends the usage of existing cellular mobile telecommunication radio frequencies allocated for ground-based communications to non-terrestrial mobile subscriber stations in a manner that avoids the possibility of signal interference between the ground-based and non-terrestrial mobile subscriber stations. The multi-dimensional cellular mobile telecommunication system adds an overlay of non-terrestrial cells of predetermined geometry and locus in space to the existing ground-based cellular mobile telecommunication network. The polarization of the cellular radio signals produced by the non-terrestrial antenna elements is a polarization that is different than and preferably substantially orthogonal to the polarization of the cellular radio signals produced by the ground-based antennas, such as a horizontal polarization, to thereby minimize the possibility of interference with the nominally vertically polarized ground-based cellular radio signals. Furthermore, the control signals exchanged between the non-terrestrial mobile subscriber stations and the non-terrestrial cell site controller are architected to avoid the possibility of interference with ground-based cell site transmitter-receiver pairs. In particular, the control channels used for the non-terrestrial mobile subscriber stations are selected such that the control signals transmitted in these channels are unrecognizable to the ground-based mobile subscriber stations and cell site transmitter-receiver pairs, so that even if broadcasts from a non-terrestrial mobile subscriber station reach a ground-based mobile subscriber station or cell site receiver, they cannot be interpreted and are rejected out of hand.

Multi-Dimensional Cellular Mobile Telecommunication Network Architecture

FIG. 1 illustrates, in block diagram form, the overall architecture of a multi-dimensional cellular mobile telecommunication network. This diagram illustrates the basic concepts of the multi-dimensional cellular mobile telecommunication network and, for the purpose of simplicity of illustration, does not comprise all of the elements found in a typical network. The fundamental elements disclosed in FIG. 1 provide a teaching of the interrelationship of the various elements which are used to implement a multi-dimensional cellular mobile telecommunication network.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between subscriber stations and the transmitter-receiver pairs as well as the nature of the data transferred there between, be it voice, video, telemetry, computer data, and the like, are not limitations to the system which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between subscriber stations located in the cells and the associated transmitter-receiver pairs located at the cell site for each of these cells.

The cellular radio telecommunication service provided in North America, for example, is designed primarily for motor vehicles and other ground-based mobile subscriber stations. The system presently in use uses a plurality of radio frequency channels in the Ultra-High Frequency (UHF) band. A channel in this system comprises a pair of UHF frequencies in the designated band. One frequency in the channel is termed the "forward" carrier and is used for transmissions from the base station to the mobile subscriber station, while the other frequency in the pair is termed the "reverse" carrier and is used for transmissions from the mobile subscriber station to the base station. Present technologies in use include analog Frequency Modulation (FM) as the method for transmitting the signal with a 30 kHz frequency channel spacing. There is also digital transmission capability in some systems, wherein a plurality of signals are multiplexed on to the same carrier, with the 30 kHz spacing between adjacent bands (TDMA) or the code space is divided into multiple channels (CDMA). A total of 832 such channels are available for cellular telephone use, and these channels are located between the frequencies of 824 MHZ to 849 MHZ, and 869 MHZ to 894 MHZ. The transmitter has 832 communication channels, 790 voice/data communication and 42 control channels. This set of channels is divided into two subsets, each consisting of 21 control channels and an associated 395 voice/data channels. A first set of channels is typically termed the "A" side of the band and the remaining set of channels is typically termed the "B" side of the band. The 416 radio channels in each set of channels are divided into 21 control channels and 395 voice/data communication channels. The 395 voice/data communication channels can be subdivided into a predetermined number of groups, with a typical selection being seven groups of approximately 56 channels in a seven cell channel reuse plan, termed a K=7 plan.

The basic ground-based cellular telecommunication network of the prior art is incorporated into this system to enable the non-terrestrial mobile subscriber stations to be integrated into the existing service structure. In particular, the mobile telecommunication switching office 200 serves to interconnect a plurality of groundbased cells 201, 202, 203 with the public switched telephone network (PSTN), as noted above. The ground-based cells 201, 202, 203 each include a transmitter-receiver pair 201TR, 202TR, 203TR and an antenna complex, which typically comprises a tower M1, M2, M3 to which is affixed one or more antenna elements A1, A2, A3, respectively.

Existing cellular mobile telecommunication systems use both directional and non-directional antenna elements to implement the desired antenna characteristic pattern. Directional antenna, as the term is used herein, does not imply that a signal is transmitted or received from a particular direction, but that the antenna has a non-isotropic radiation pattern. A directional antenna, or a plurality of directional antenna elements, is preferably used on the ground-based cellular base station to increase signal separation. The antenna structure used in ground-based mobile cellular telecommunications is such that signals emanating from the cell site transmitter antenna elements of antennas A1, A2, A3, propagate in a substantially radial direction from the antenna in all directions with the top of the antenna pattern being substantially coplanar with the Earth's surface and at a level that corresponds to the elevation of the transmitter antenna above the Earth's surface. The receiver antenna has characteristics that are analogous to that of the transmitter antenna. The polarization of these signals is vertical in nature, shown by arrow GP in FIG. 1.

The multi-dimensional cellular mobile telecommunication network adds to the existing mobile cellular telecommunication network one or more non-terrestrial cells. A non-terrestrial cell is defined as an installation which is equipped with at least one non-terrestrial cell site transmitter-receiver pair, such as 201 A and an associated antenna AA1 for receiving and transmitting cellular telecommunication transmissions to and from non-terrestrial mobile subscriber stations, such as aircraft 21, 22, which are equipped with mobile subscriber station apparatus 21 B, 22 B. The non-terrestrial transmitter-receiver pair 201 A is interconnected to the public switched telephone network PSTN via the mobile telecommunication switching office MTSO. The non-terrestrial cell site antenna AA1 has a radio signal radiation pattern which is directed above a horizontal plane encompassing the antenna. The majority of the radiated radio signal is directed at angles above the horizontal plane, which angles are typically in the range of 1.5° to 4° in magnitude, to avoid interference with ground-based mobile cellular telephone stations 23, 24, 25. The multi-path effect is also minimized since the energy level of the signals impinging on the reflective earth surface is reduced. In addition, the polarization of these radio signals is selected to be substantially orthogonal to the polarization of the radio signals emanating from the ground-based antennas, and is typically horizontally polarized, as shown by arrow AP in FIG. 1.

The non-terrestrial cell site transmitter-receiver pair 201 A can be integrated with an existing ground-based cell site transmitter-receiver pair, in that there is some sharing of equipment which mounts the antenna elements on a common tower M1 and/or interconnects both cell site transmitter-receiver pairs to the public switched telephone network PSTN. In the embodiment of FIG. 1, the non-terrestrial cell site antenna elements AA1 are mounted on the same tower M1 as the antenna elements A1 used to implement the ground-based cell site. The non-terrestrial cell site antenna elements AA1 are typically mounted below the existing antenna elements A1 used to implement (or reserved for) the ground-based cell site, which also reduces the ground footprint, thus reducing the Service Area Boundary as it exists for a ground-based mobile.

Figure 2:
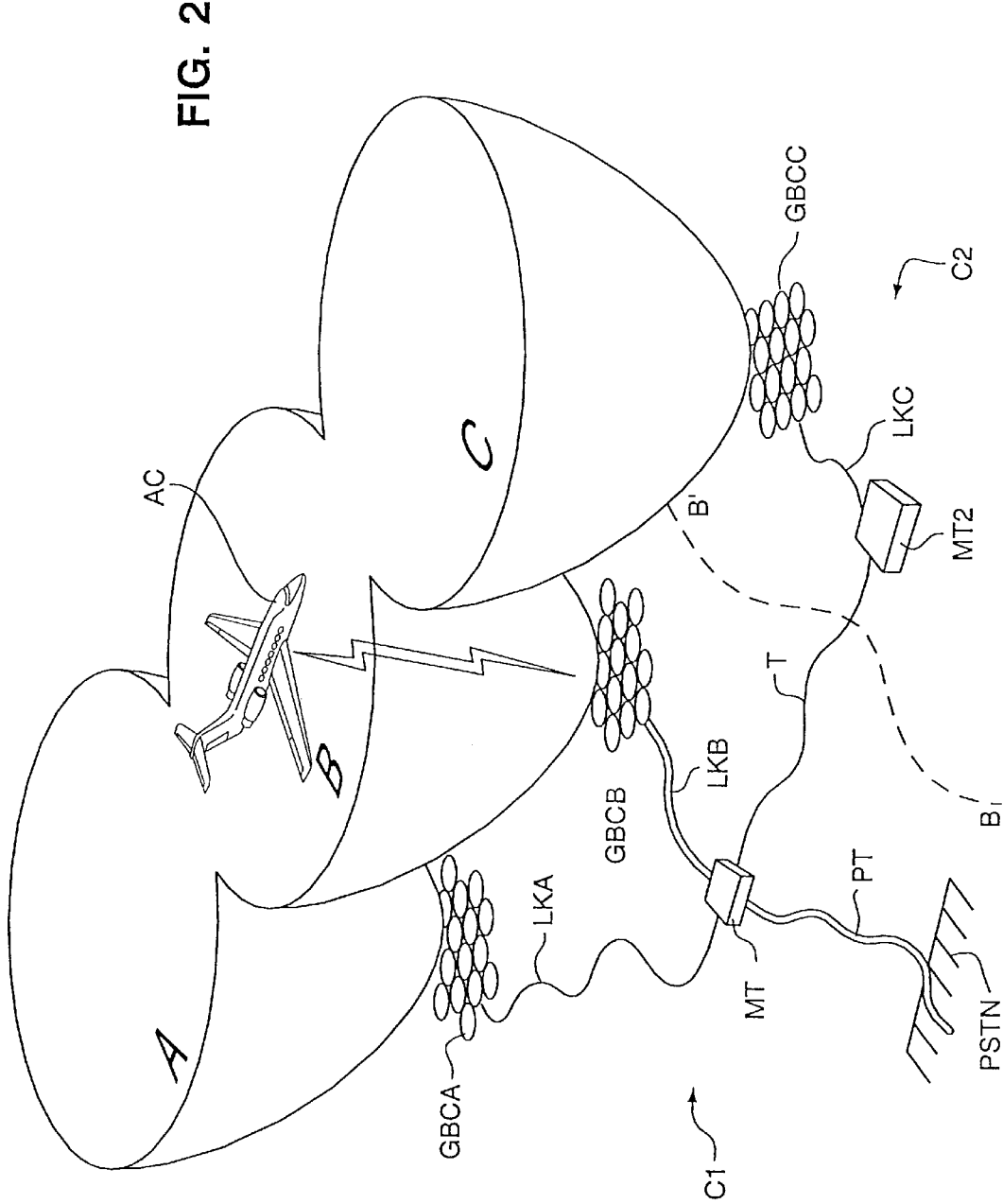
FIG. 2 illustrates, in block diagram form, additional details of the architecture of the non-terrestrial component of the multi-dimensional cellular telecommunication network.

FIG. 2 illustrates in block diagram view, additional details of the architecture of the non-terrestrial component of the multi-dimensional cellular telecommunication network where the non-terrestrial mobile subscriber station comprises an aircraft AC which is located in non-terrestrial cell B, which non-terrestrial cell overlays a plurality of ground-based cells GBCB. Two additional non-terrestrial cells A, C are also shown, each of which overlays another plurality of ground-based cells GBCA, GBCC, respectively. The three non-terrestrial cells A—C are shown as being oriented adjacent to each other, with cell B being located between non-terrestrial cells A and C. It is typical that other non-terrestrial cells would be implemented adjacent to non-terrestrial cells A—C to provide complete coverage of the non-terrestrial space that extends above the ground. For simplicity of description, only three non-terrestrial cells A—C are shown in FIG. 2. The existing ground-based cells are each connected via trunks LKA—LKC to an associated mobile telecommunication switching office MT1, MT2, which are themselves connected together via trunk T and to public switched telephone network PSTN via trunks PT. In this environment, it is typical that two different providers are serving the network, with a first company serving region C1 and a second company serving region C2, with the dividing line between the two service areas being shown in the figures by the dashed line B—B'. In this system environment, a call is established from a subscriber located in the aircraft AC, using a mobile subscriber station apparatus located in the aircraft AC in the well known manner of the existing ground-based cellular systems. The control signals from the mobile subscriber station apparatus located in the aircraft AC are transmitted to the cell site transmitter-receiver pair of non-terrestrial cell B, which is served by the first cellular company which provides service in region C1. The call is connected via trunk LKB to the mobile telecommunication switching office MT1, which interconnects the call connection to the public switched telephone network PSTN via trunk PT, in well known fashion. The call connection is then extended to the designated subscriber (not shown) which is assumed for this description to be located at a "land line" station. The allocation of frequencies and the subscriber identification for aircraft AC is managed via the non-terrestrial cell site control software which operates independent of the ground-based cellular network and which can be operational in the mobile telecommunication switching office MT1 which serves the non-terrestrial cell site for non-terrestrial cell B.

Multi-Dimensional Cellular System Control Channels

A particular problem is encountered when attempting to use cellular mobile telephone equipment from a non-terrestrial location, such as an aircraft. The elevated position of the mobile cellular telephone station when located aboard an aircraft causes the signal to be broadcast over a wide area of the surface of the earth, where it is received by many ground-based cell site transmitter-receiver pairs. In addition, the signal strength at a plurality of these ground-based cell site transmitter-receiver pairs may be substantially equal, making determination of the controlling base station a difficult choice. Thus, mobile cellular subscriber stations are prohibited by governmental regulatory agencies, such as the U.S. Federal Communications Commission, from transmitting from aircraft. The cellular telephone network requires a minimum signal-to-noise ratio to enable the communications to be of an acceptable quality. The presently required separation for analog AMPS service between signal power level and the background or noise power level can be as low as 6 dB (with 8–10 dB being typical) for the non-terrestrial subscriber station. In contrast, the ground-based mobile required separation is 18 dB for both the mobile subscriber station and the cell-site receiver for interference free communications. Thus, the non-terrestrial cellular communication portion of the multidimensional system must provide adequate signal strength by the appropriate selection and siting of antenna elements within the constraints of available signal power. In addition, the interference between ground-based and non-terrestrial mobile subscriber stations must be obviated by the signal characteristics as well as communication control philosophy.

Figure 4:
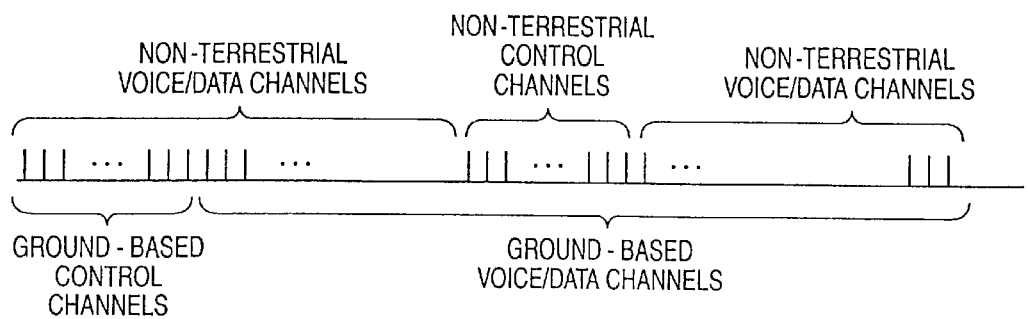
FIG. 4 illustrates the non-terrestrial cellular frequency allocation for a typical cell.

The communication control philosophy portion of this unique solution comprises a manipulation of the control channels such that control signals originated by a non-terrestrial mobile subscriber station cannot cause either a ground-based cell site receiver or ground-based mobile subscriber station receiver to receive and interpret these control signals. The designation of control channels within the plurality of available channels represents the method of bifurcating the volume of space into two disjunct regions: ground-based and non-terrestrial. As shown in FIG. 4, the control channels dedicated for use in non-terrestrial cellular communications are those which are designated as voice/data communication channels for the ground-based cellular communications. Thus, each ground-based cell site transceiver communicates with the ground-based mobile subscriber stations extant in its cell on predetermined control channels, which control channels are ignored by non-terrestrial mobile subscriber stations, since these channels are voice/data communication channels in the view of the non-terrestrial mobile subscriber stations. Similarly, each non-terrestrial cell site transmitter-receiver pair communicates with the non-terrestrial mobile subscriber stations extant in its cell on predetermined control channels, which control channels are ignored by ground-based mobile subscriber stations, since these channels are voice/data communication channels in the view of the ground-based mobile subscriber stations. Thus, the allocation of control channels in the non-terrestrial cells represents a paradigm shift with respect to the adjacent ground-based cells. This philosophy can be implemented in a cost effective manner, since the large installed base of ground-based mobile subscriber stations and ground-based cell site transmitter-receiver pairs inherently reject control signals transmitted in the voice/data communication channels. It is only the newly constructed non-terrestrial mobile subscriber stations and their associated cell site transmitter-receiver pairs which must be modified to reassign control channels. This implementation incurs a relatively small cost.

An alternative implementation of the communication control philosophy comprises allocating a subset of the available channels exclusively to non-terrestrial cellular communications, with this subset of dedicated channels being divided into control channels and communication channels as with the existing channel allocation pattern. However, the dedication of even a small number of channels can be problematic, since these channels are removed from all ground-based cells and can have significant impact on traffic handling capacity. In addition, such a solution requires the modification of all existing equipment.

Ubiquitous Mobile Subscriber Station

In this environment, the ubiquitous mobile subscriber station enables the subscriber to receive wireless cellular mobile telecommunication services in a unified manner in both the terrestrial (ground-based) and non-terrestrial regions by automatically transitioning between the communications paradigm used in ground-based cellular communications and the communications paradigm used in non-terrestrial cellular communications as a function of the present location of the ubiquitous mobile subscriber station. The subscriber who is equipped with an ubiquitous mobile subscriber station can maintain a single set of identification data (MIN, ESN) regardless of their location in the multi-dimensional cellular mobile telecommunication system and independent of the mode of operation: ground-based cellular communications or non-terrestrial cellular communications. The ubiquitous mobile subscriber station automatically switches between the ground-based control parameters (control channel assignment, power levels, signal polarization) and the non-terrestrial based control parameters (control channel assignment, power levels, signal polarization, network assignment).

Figure 3:
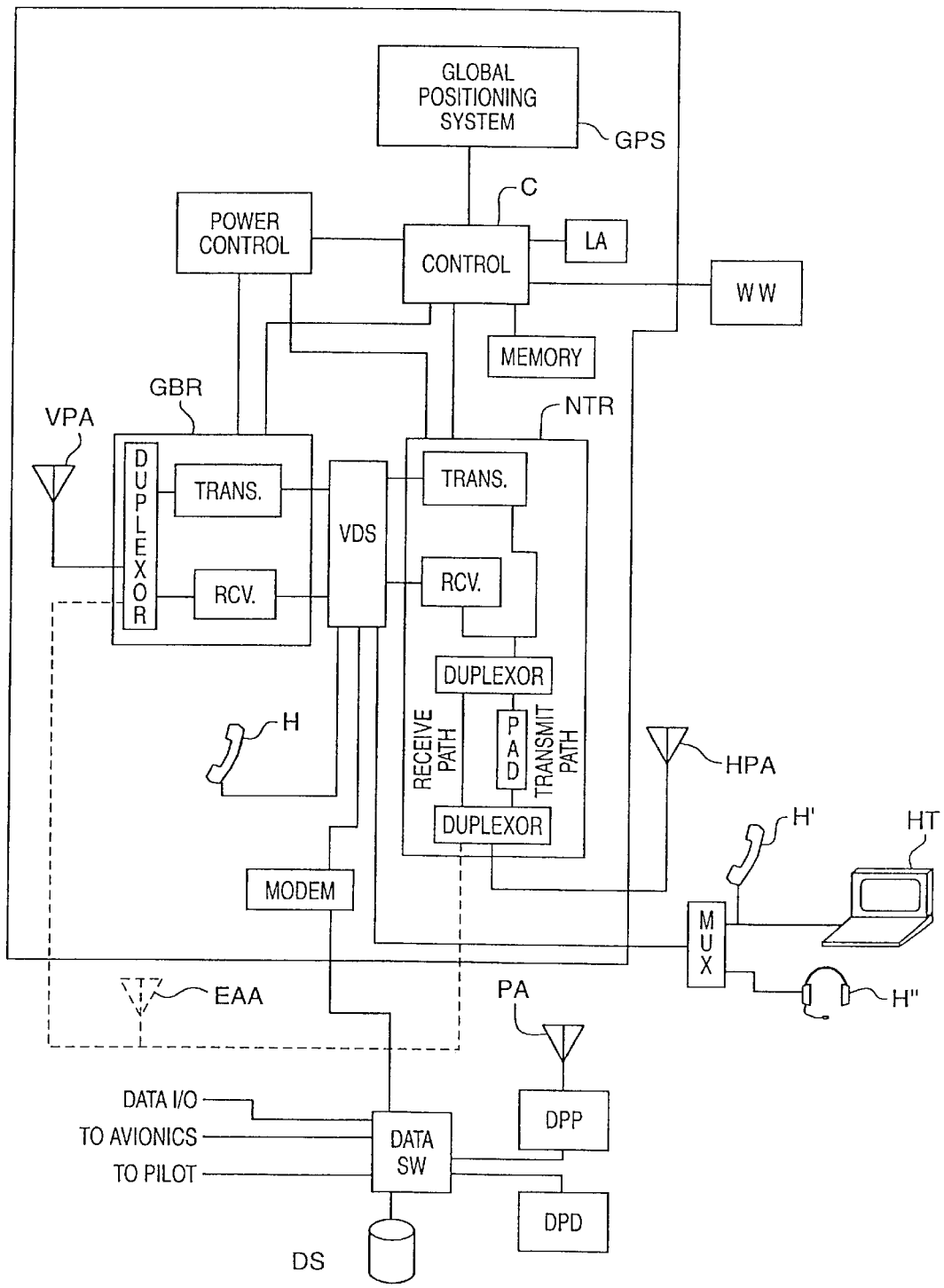
FIG. 3 illustrates, in block diagram form, the architecture of a typical embodiment of the ubiquitous mobile subscriber station of the present invention.
Figure 6:
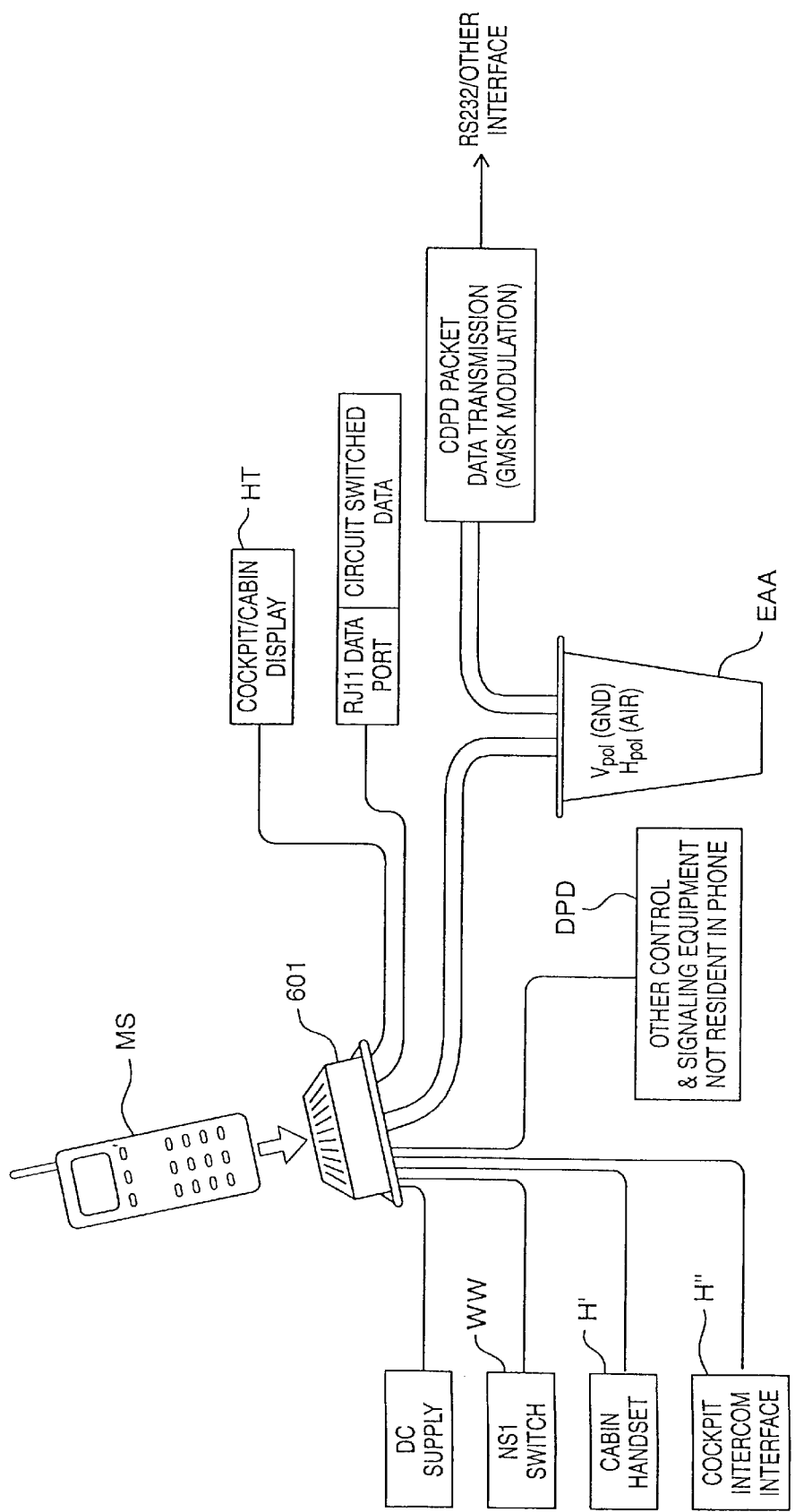
FIG. 6 illustrates a typical hardware architecture of the ubiquitous mobile subscriber station of the present invention.

FIG. 3 illustrates, in block diagram form, the architecture of a typical embodiment of the ubiquitous mobile subscriber station of the present invention, while FIG. 6 illustrates a typical hardware architecture of the ubiquitous mobile subscriber station of the present invention. This particular embodiment of the ubiquitous mobile subscriber station is disclosed to illustrate the concepts of the invention and is not intended to limit the application of the disclosed concepts. In this particular application, the ubiquitous mobile subscriber station MS comprises a handset format apparatus in which is mounted the communication apparatus necessary to support both the ground-based cellular communications as well as the non-terrestrial cellular communications. The handset mount 601 includes other apparatus that interfaces the ubiquitous subscriber station MS to the aircraft and instrumentation contained therein.

The ubiquitous mobile subscriber station MS can contain mobile unit location apparatus LA to identify whether the ubiquitous mobile subscriber station MS should be served by the non-terrestrial cell or the ground-based cell. The mobile unit location apparatus LA produces an indication of whether the mobile unit is aloft (optionally its altitude above the ground level) and the control circuit C automatically switches between the non-terrestrial communication mode and the ground-based communication mode by activating the appropriate radio apparatus to initiate a communication connection. To achieve the automatic transition, the ubiquitous mobile subscriber station MS is equipped with both a non-terrestrial mobile subscriber station radio apparatus NTR as well as a ground-based mobile subscriber station radio apparatus GBR. The ubiquitous mobile subscriber station MS can switch between the non-terrestrial and ground-based systems in response to the pilot's activation of the aircraft landing gear, or the "weight on wheels" condition when the aircraft touches down as indicated by the aircraft attitude determining apparatus WW, or its altitude above the ground level as determined by the mobile unit location apparatus LA.

The ubiquitous mobile subscriber station MS is equipped with a non-terrestrial mobile subscriber station radio apparatus NTR and a ground-based mobile subscriber station radio apparatus GBR, each of which includes the transmitter TRANS and receiver RCVR circuits well known in cellular communications for providing voice and data communications to handset H and modem via a voice data switch VDS. The apparatus also includes a non-terrestrial antenna HPA (horizontally polarized) and a ground-based antenna VPA (vertically polarized), which are typically mounted on an exterior surface of the ubiquitous mobile subscriber station MS, although the non-terrestrial antenna HPA may be mounted external to the ubiquitous mobile subscriber station MS for improved signal reception. The antenna mounting is typically directly fixed to the ubiquitous mobile subscriber station MS or can be supplemented by a separate unit EAA which is mounted on the exterior surface of the aircraft. In this latter case, the non-terrestrial antenna HPA can be mechanically steered so that the radiation pattern of the antenna elements can be aligned with the cell site transmitter and receiver antennas to thereby enhance the quality of the communication there between. Alternatively, the non-terrestrial antenna HPA can be electronically steered by adjusting the phase and/or magnitude of the signals applied to the antenna elements of an array as is well known in this technology. The power output of the non-terrestrial transmitter TRANS can also be regulated as a function of the distance from the cell site transmitter antenna to ensure a relatively constant signal level, using the Dynamic Power Control circuit presently available in many cellular radio systems.

Furthermore, the transmitter, receiver and control circuits may be used to serve a single handset unit H and can optionally be multiplexed to serve a plurality of auxiliary handset units H', H" as in a commercial airliner application. The auxiliary handsets can be hard wired to the handset mount 601 or can be wireless units of limited communication range which interconnect with the handset mount 601 via radio frequency transmissions. In the multi-user application, the handset mount 601 can comprise a "mini-cell" wherein the various auxiliary handsets are managed by the handset mount 601 in a manner analogous to that performed by the typical cell site/MTSO. Thus, the handset units can be of a different technology than the single handset applications, with the handset mount 601 performing an integration function as well as the multiplexing function. The handsets can be personal communication system (PCS) units, pagers, code division multiple access (CDMA) units, or any other wireless communication devices which are in use by individuals. The handset mount 601 receives the signals generated by the various handset units and formats (if necessary) the data contained in these transmissions into the format used for the radio link transmissions to the cell site. The communications in the reverse direction are managed in a complementary manner as is well known. The handset units H', H" can each have a unique identification which enables the underlying cellular communication network to communicate with the unit. The handset mount 601 can therefore perform the handset registration function by polling the handset units extant in the space served by the electronics unit to thereby identify these units. This unit identification data can then be transmitted to the cell site via the control channels to enable the cellular network to ascertain the location of these particular units. Thus, when a ground-based subscriber (for example) initiates a call to one of these handset units, the MSTO can scan the mobile subscriber records to locate the identified mobile subscriber station. This data is then used by the cellular network to establish a communication link to the identified mobile subscriber unit, whether it is ground-based or non-terrestrial at this point in time. In this manner, what may traditionally may be considered ground-based mobile subscriber stations can function as non-terrestrial subscriber stations in the environment just described.

Network Selection

The present ubiquitous mobile subscriber station MS can include the capability to route the communications signals generated by the present ubiquitous mobile subscriber station MS to a selected network for transmission to the designated destination. This capability includes the separate routing of the voice transmissions from the data transmissions, least cost and/or performance based routing of signals and the use of proprietary networks. The options available are not limited by the architecture of this present ubiquitous mobile subscriber station MS. In particular, the voice transmissions can be analog or digital, the data transmissions can be circuit switched or packet switched. The mode of transmission can include satellite directed, cellular directed and includes various combinations of these above-noted options.

The cell provides a digital data platform using circuit switching and/or packet switching. The existing cellular protocol of MNP10 or enhanced cellular protocols of ETC or ETC2 provide enhanced throughput. The interface equipment at the cell site strips off the data and routes it to a selected data switching network.

Ubiquitous Mobile Subscriber Station—System Features

The present ubiquitous mobile subscriber station MS incorporates a plurality of features that enable spectrum reuse, which features include:

Horizontal polarization of signal

Ultra-low airborne transmit power levels

Aircraft antenna patterns that minimize nadir (Earth directed) EIRP

Tightly controlled dynamic power control settings

Very low dynamic power control levels (much lower than ground cellular)

Ground-based cellular operates at much higher signal levels

Non-standard control channels

Base station frequency coordination

Base station antenna pattern isolation

Base station receive chain loss minimization

These features collectively create system level isolation in the radio frequency signaling path. This isolation enables frequency reuse and separates non-terrestrial cellular mobile communications from ground-based cellular mobile communications. The features are noted below.

The horizontal polarization of the signal feature was discussed above with respect to the underlying multidimensional cellular mobile telecommunication system, and comprises the selection of an antenna pattern that reduces the possibility of interacting with existing ground-based cellular mobile telecommunications systems. The polarity orthogonality of the two sets of signals reduces the coupling there between.

The ultra-low airborne transmit power levels feature represents a control by POWER CONTROL circuit of the output signal power produced by the ubiquitous mobile subscriber station MS to minimize the likelihood of receipt of the non-terrestrial cellular signal by ground-based cell sites or subscriber stations. The power level of the signal transmitted by the ubiquitous mobile subscriber station MS is typically 5.5 milli-watts and less than 500 microwatts at lower altitudes (up to 5,000 feet) and within 75 nautical miles of the base station. This magnitude output signal strength represents a significant departure from the standard ground-based cellular signal strength, and the non-terrestrial cellular signals are therefore typically rejected by the ground-based cell sites and subscriber stations. The non-terrestrial mobile subscriber station apparatus NTR can include an attenuator PAD which serves to reduce the power output of the transmitter TRANS so that a reduced output level is maintained. The duplexor circuits function, in well-known fashion to interconnect the transmitter and receiver circuits to the antenna HPA, with the transmit and receive paths between the two duplexors being differentiated by the presence of the attenuator PAD in the transmit path. Thus, the use of the attenuator PAD to connect the antenna HPA enables the use of conventional transmitter TRANS and receiver RCV circuits without having to modify their operation to account for the reduced power output levels used in non-terrestrial cells. Alternatively, a custom designed "NTR" could include directly shifted power levels removing the need for the duplexors and PAD.

Aircraft antenna patterns that minimize nadir (Earth directed) effective radiated power (ERP) are used in the implementation of the antenna(s) on the mobile unit. Two commonly used antenna types are a belly mounted blade and a vertical stabilizer mounted blade antenna. The belly mounted blade antenna uses a vertical slot in which the E-Field is horizontally polarized. This slot antenna has a pattern which is the complement to a dipole arranged in a vertical plane but has orthogonal polarization. The pattern thereby exhibits a null toward the earth (nadir) which is the direction for minimal slant range and hence minimal propagation loss. The level of energy is greatly reduced due to this pattern shaping, but is still orthogonally polarized with respect to ground-based antenna patterns. The second antenna type is a horizontally mounted blade antenna deployed on either side of the vertical stabilizer. This antenna uses a dipole type of radiating element that is horizontally polarized. The horizontal stabilizer of the aircraft is mounted between this horizontally mounted blade antenna and the earth, thereby greatly reducing the power directed toward the earth (nadir). The ubiquitous mobile subscriber station MS operates with tightly controlled dynamic power control settings. The MTSO is programmed to have a very tight dynamic power control range (typically±one power step), which power is set very low, as noted above. In the existing analog Advanced Mobile Phone System (AMPS), stations are regulated to a maximum allowed effective radiated power (ERP). In a similar manner, each ubiquitous mobile subscriber station MS is commanded to a power level within a predetermined operating range. A typical set of power control levels in watts of output from the mobile transmitter are:

| Level | Power: Existing Systems | Power: Non-Terrestrial System |
| --- | --- | --- |
| 0 | 4.0000 | 0.0700 |
| 1 | 1.6000 | 0.0280 |
| 2 | 0.6000 | 0.0110 |
| 3 | 0.2500 | 0.0040 |
| 4 | 0.1000 | 0.0018 |
| 5 | 0.0400 | 0.0007 |
| 6 | 0.0160 | 0.0003 |
| 7 | 0.0060 | 0.0001 |

In addition, the line-of-sight propagation of the non-terrestrial originated cellular signals causes minimal fading anomalies, since the fading is limited to energy reflecting off the earth surface where the terrain is flat. Fading is typically very slow in its periodicity and can be easily compensated for by the MTSO adjusting the output power level of the ubiquitous mobile subscriber station.

A corollary to the above-noted restricted power output from the ubiquitous mobile subscriber station is that the ground-based cellular operates at much higher signal levels. Therefore, hand-off in the ground-based cellular system occur at signal levels orders of magnitude greater than the operating levels of the ubiquitous mobile subscriber stations. The presence of a cellular signal from a ubiquitous mobile subscriber station is therefore ignored by the ground-based cellular mobile subscriber stations and their serving cell sites. Thus, a great deal of signal separation, hence no interference, is maintained between the two virtual networks.

Use of more lightly loaded EAMPS frequencies reduces interference between ubiquitous mobile subscriber stations and ground-based base stations by separating the frequencies at which they operate. Where the non-terrestrial cell and one or more of the ground-based cells are on same frequency, the frequency used for the non-terrestrial cell is selected to correspond to a frequency that is light in traffic, for example—away from a metropolitan area.

As noted above, the ubiquitous mobile subscriber station MS uses non-standard control channels so that the ground-based cellular system and the non-terrestrial cellular system do not interfere.

Base station frequency is coordinated with the ground-based mobile cellular communication system to avoid the use of the same base station transmitter frequencies.

Base station antenna tilt is selected to reduce the multipath power so that the steps in the power level are stable and incremented by a single predetermined step at a time as the ubiquitous mobile subscriber station moves in a direction away from the base station. This process of precise power control maintains transmit quality by controlling power output.

Base station receiver loss minimization is used to separate the power levels of the ubiquitous mobile subscriber station signals and those emanating from the ground-based cellular subscriber stations. Low noise active amplifiers can be used in the non-terrestrial cell site to maintain a low noise floor, well below that of the ground-based system. With the exception of cable resistive losses, low noise active amplifiers and active distribution are used to enable the use of low signal power from the ubiquitous mobile subscriber station.

Thus, there are a plurality of factors that can be used individually or in combination to prevent interference between the ubiquitous mobile subscriber station and the ground-based subscriber stations and their associated cell sites.

Ubiquitous Mobile Subscriber Station—CDMA System Features

In addition to the above-noted characteristics of the ubiquitous mobile subscriber station, there is an alternative cellular communication system termed Code Division Multiple Access (CDMA) which transmits a plurality of communications on each channel and differentiates the various mobile subscriber stations by the code assigned to each mobile subscriber station. These systems transmit multiple conversations on the same frequency. In order to maintain the overall system noise level at a minimum, the power level of the various mobile subscriber stations must be precisely controlled. Furthermore, the large size of a non-terrestrial cell adds to the power control problem, since the disparity in distances among the various ubiquitous mobile subscriber stations cause significant diversity in the received power of the signals from these ubiquitous mobile subscriber stations, which power level dynamically varies as the ubiquitous mobile subscriber stations move about the cell. This means that a non-terrestrial station using the same code as a terrestrial station could cause unacceptable interference if RF systems techniques such as polarization, low transmit power, shaped non-terrestrial/ground antenna patterns, and the like are not deployed.

With a typical CDMA system, 64 Walsh codes are used to differentiate among the mobile subscriber stations and a predetermined number of these codes can be reserved for the exclusive use by ubiquitous mobile subscriber stations, since generally all of these codes are not all are used in a typical ground-based cell site. Thus, the code separation in a CDMA system can be used to prevent the interference between ubiquitous mobile subscriber stations and the ground-based subscriber stations and their cell sites. In conjunction with unique Walsh code assignments, the network can also assign unique "Wide Area" code words to identify a virtual network overlay.

Figure 7:
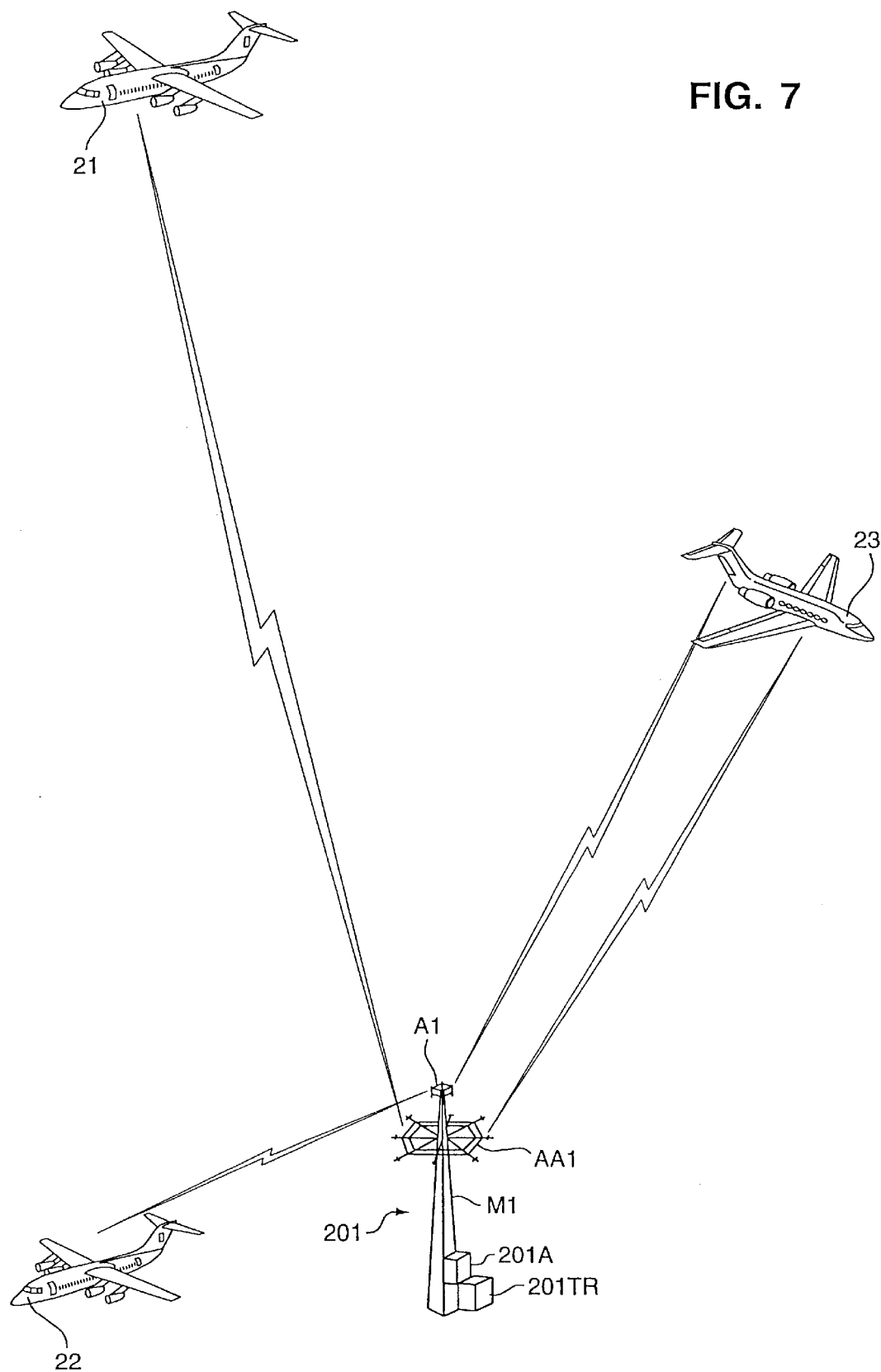
FIG. 7 illustrates the soft handoff operation of a cellular mobile telecommunication call connection between a non-terrestrial cell and a ground-based cell, using the ubiquitous mobile subscriber station of the present invention.

FIG. 7 illustrates the soft handoff operation of a cellular mobile telecommunication call connection between a non-terrestrial cell and a ground-based cell, using the ubiquitous mobile subscriber station of the present invention. The ubiquitous mobile subscriber station can effect a soft handoff between a ground-based cell and a non-terrestrial cell, since the ubiquitous mobile subscriber station is equipped with apparatus that can simultaneously support both modes of communications. Thus, the CDMA cellular switch views the non-terrestrial cell as another cell in the multi-dimensional cellular network and the handoff between two cells is processed in conventional fashion. The ubiquitous mobile subscriber station can be programmed to identify when it is below a predetermined distance above ground level (such as 5,000' above ground level), where it simultaneously activates both the ground-based and non-terrestrial transmitter and receiver elements described above (as for aircraft 23). As with any CDMA soft handoff, the cells which receive transmissions from a subscriber station determine the signal strength of the received signals and the CDMA switch arbitrates among the cells to select the cell that is best adapted to handle the communication connection. Thus, the ubiquitous mobile subscriber station can transition between non-terrestrial cells (as with aircraft 21) and ground-based cells (as with aircraft 22) as it changes its position within these cells, to thereby provide seamless communications for the ubiquitous mobile subscriber station. Similarly, in a TDMA based system, the ubiquitous mobile subscriber station can effect a soft handoff between a ground-based cell and a non-terrestrial cell, since the ubiquitous mobile subscriber station is equipped with apparatus that can simultaneously support both modes of communications.

Data Features of the Ubiquitous Mobile Subscriber Station

The inherent differences between the mobile unit used by subscribers in ground-based and non-terrestrial systems provides opportunities for enhanced capabilities in the ubiquitous mobile subscriber station. In particular, the ground-based mobile unit is either a user carrying the mobile subscriber station or an automobile in which the mobile subscriber station is installed. In both instances, the need for additional services or features is limited. In contrast, the use of a ubiquitous mobile subscriber station MS is typically in an aircraft MU, which has an existing set of communications needs which can be served, either uniquely or redundantly, by the ubiquitous mobile subscriber station MS.

In particular, the communication needs associated with an aircraft include, but are not limited to, the classes of services noted herein:

Occupant data communications

Telemetry relay

Aircraft safety and maintenance

Pilot-Controller communications

Aircraft operations support

Each of these categories represents an opportunity to use the inherent communications capabilities of the ubiquitous mobile subscriber station MS in a transparent manner. The voice communications activity in a ubiquitous mobile subscriber station MS is typically only a minimal use of the communication capacity of this equipment. Therefore, as shown in FIG. 3, the ubiquitous mobile subscriber station MS can be interconnected with a plurality of existing apparatus in the aircraft or with newly installed equipment to provide these services.

The data communication capability of the non-terrestrial subscriber station MS can be enhanced by increasing the bandwidth of the communication connection that is established with the cell site. There are a number of ways to provide an increased bandwidth, including allocating multiple communication channels to the data communication function. Thus, a single call connection for data communication purposes comprises multiple physical communication channels managed in parallel to thereby multiply the data communication capacity associated with a single channel in the system. Alternatively, dedicated data communication channels can be allocated in the defined communication space, with the data communication channels occupying the bandwidth of multiple voice communication channels. In either case, the data communication capability of the ubiquitous mobile subscriber station MS can be adapted to suit the needs of the non-terrestrial vehicle and its operation.

Spectrum Expander for Pilot Communications

Figure 8:
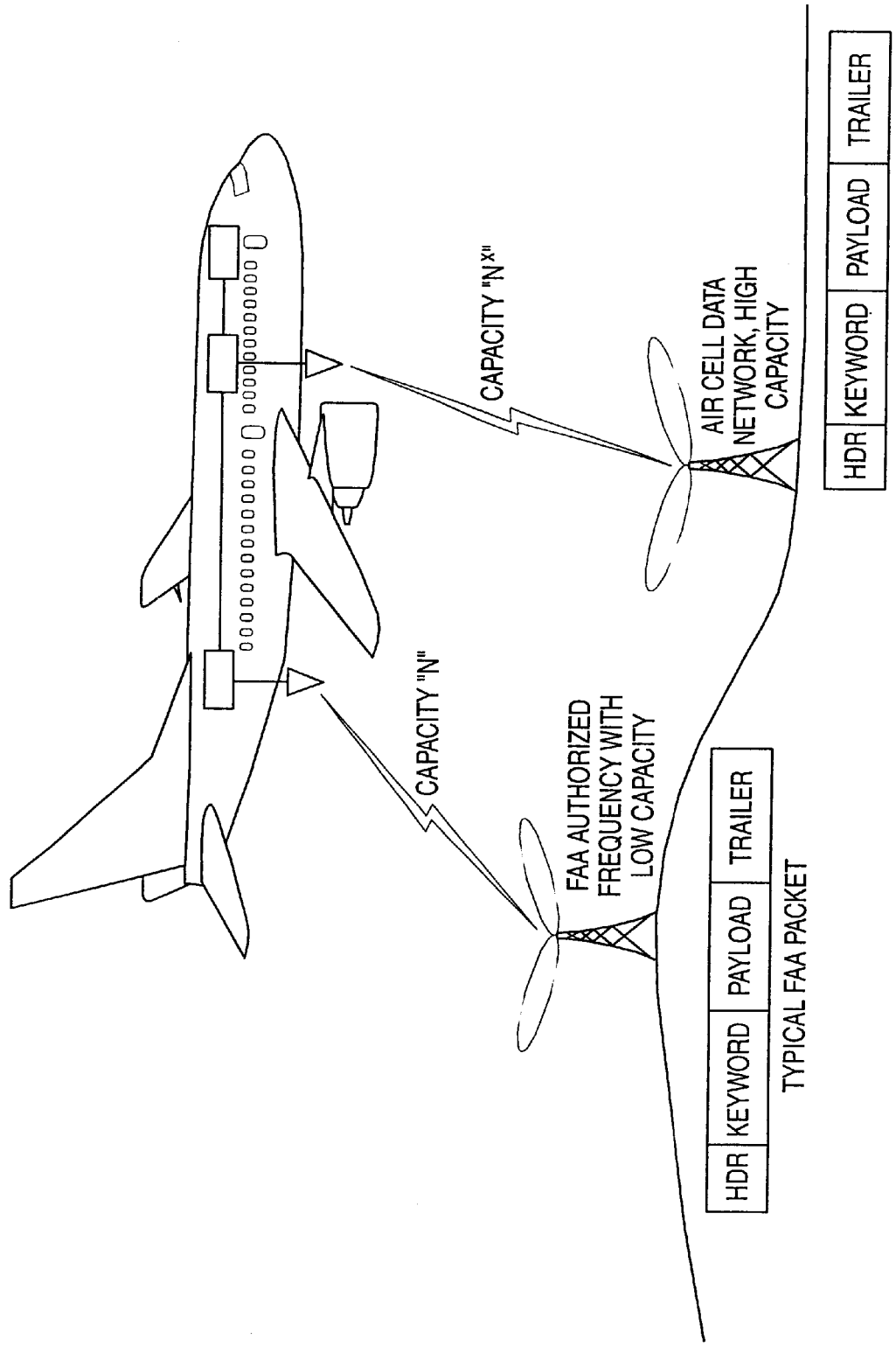
FIG. 8 illustrates the use of the ubiquitous mobile subscriber station of the present invention in a spectrum expander capacity.

FIG. 8 illustrates the use of the ubiquitous mobile subscriber station of the present invention in a spectrum expander capacity. The existing paradigm for pilot to ground communications in the non-terrestrial environment comprises the use of predesignated radio frequency channels of limited bandwidth (capacity "N"). Since these channels are fixed in frequency and bandwidth, they represent a limitation in the data transmission capability between the aircraft and the ground. The above-described ubiquitous mobile subscriber station MS can be used in a cooperatively operative mode to expand the spectrum available to the existing pilot to ground communications channel by operating in parallel with this channel and providing an additional data bandwidth of capacity "N*". In particular, one scenario comprises the transmission of a typical FAA packet data transmission comprising a header, keyword, payload and trailer. The transmission of a keyword to the aircraft over the existing pilot to ground communications channel enables the ubiquitous mobile subscriber station MS to unlock packet data that is transmitted to the ubiquitous mobile subscriber station MS over the non-terrestrial cellular telecommunications network. The use of a keyword ensures both the privacy of the data transmission and control over such data transmissions by the source of the pilot to ground communications, using FAA controlled and authorized frequencies. This architecture therefore comprises a hybrid data communication network wherein the allocated pilot to ground communication channels authenticate the broadcasts to the ubiquitous mobile subscriber station MS, thereby expanding the spectrum presently available.

Occupant Communications

A first example is the occupant data communications class of service wherein the aircraft occupants can interconnect a terminal device HT with the handset H to obtain additional communications capability. An example of this is the use of a personal computer, equipped with a modem, to the handset connection to thereby enable the user to transmit and receive data over the cellular voice communication connection, as is well known. The data can include facsimile transmissions, E-Mail, data files and the like. Additionally, the terminal device HT can include a video display and the data displayed thereon can be entertainment/informational programs that are retrieved from a program data storage system DS resident in the aircraft or uploaded from the cell site or a source connected to the ubiquitous mobile subscriber station MS via a cellular communication connection. Additionally, the ubiquitous mobile subscriber station MS can have a built-in modem MODEM for the provision of data communication functions to any user selected peripheral device (not shown) to extend the capabilities of this apparatus.

Telemetry Data Collection

Figure 5:
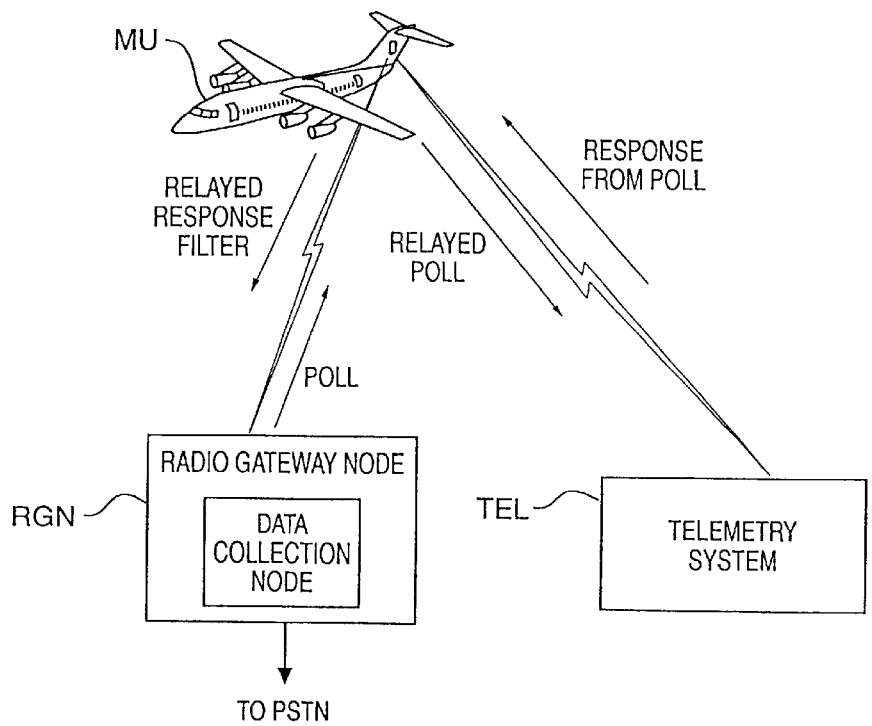
FIG. 5 illustrates a typical application of the telemetry data collection function.

FIG. 5 illustrates a typical application of the telemetry data collection function. As the aircraft flight path is traversed, the ubiquitous mobile subscriber station MS, or a second transceiver DPP (such as a spread spectrum transceiver) which is connected to the ubiquitous mobile subscriber station MS, can function to retrieve data from ground sites, such as telemetry system TEL, via the use of a polling capability. In particular, there are numerous remotely located ground-based telemetry stations TEL which function to collect data, such as oil/gas well output data, stream flow data, meteorological data, and the like. The collection of this data is expensive since there typically is no existing communication infrastructure that serves these sites. The second transceiver DPP connected to the ubiquitous mobile subscriber station MS can establish a communication connection to these ground-based telemetry stations TEL as the aircraft flies over these sites. Since the ubiquitous mobile subscriber station MS is aircraft based, a line of sight communication capability from the second transceiver DPP covers a significant amount of ground area. The telemetry communication can be effected by automatically, or on a periodic basis, broadcasting a poll query via polling antenna PA in a downward direction. The ground-based telemetry stations TEL that are within communication range of the second transceiver DPP can respond to the poll, in well known fashion, to upload telemetry data to the ubiquitous mobile subscriber station MS for storage in data storage memory MEMORY for later transmission to a data collection site or the data storage memory MEMORY can comprise a data storage medium, such as a magnetic tape, which is physically removed from the ubiquitous mobile subscriber station MS for delivery to a data collection center. Alternatively, the control channel (or voice multiplexed with data) of the ubiquitous mobile subscriber station MS can be used for data transmission during an existing voice communication call or the communication link can be automatically activated to originate a data transfer call when the ubiquitous mobile subscriber station MS is not in use.

The diagram of FIG. 5 illustrates a typical application of the telemetry data collection function. A radio gateway node RGN is sited to collect data from a plurality of remotely located telemetry systems TEL. Each telemetry system TEL can be considered to be a remote node of a data collection system. For example, the radio gateway node RGN can be a ground-based wireless communication system located at a site where it is connected to the public switched telephone network PTSN to thereby enable the radio gateway node RGN to establish data communication connections with remotely located data processing equipment. The radio gateway node RGN collects data from a plurality of remotely located nodes, each comprising a telemetry system TEL by means of the ubiquitous mobile subscriber station MS located in an aircraft that is engaged in an overflight of the region served by the radio gateway node RGN. The data collection function is initiated by the cooperative interaction between the radio gateway node RGN and the ubiquitous mobile subscriber station MS to create a communication connection there between to initiate a data collection operation. The radio gateway node RGN transmits a poll to the ubiquitous mobile subscriber station MS, which relays the received poll to the telemetry system TEL as noted above. The telemetry system TEL responds to this received poll by formatting the data stored in its memory pursuant to the appropriate protocol and transmitting this data to the ubiquitous mobile subscriber station MS. The ubiquitous mobile subscriber station MS simply relays the received data to the radio gateway node RGN, where it is stored in the data collection node contained therein for later processing and/or transmission to the data processing center. The polls transmitted by the radio gateway node RGN can be specifically addressed, as is well known, to a selected telemetry station TEL, so that the received response can be simply recorded and associated with the site at which the addressed telemetry station TEL is located.

Thus, the ubiquitous mobile subscriber station MS can function as an ultra-low earth orbit repeater station for the ground-based telemetry stations TEL. Where the aircraft is equipped with a Global Positioning System (GPS), this apparatus can be used to precisely locate aircraft, and direction of travel, so that the polling of the ground-based telemetry stations can be selective, since the ubiquitous mobile subscriber station can identify which ground-based telemetry stations are now in polling range of the aircraft. In addition, the ground network and the nodes contained therein can be equipped with intelligence, such as a neural network, to learn and remember when transmission times are available, based upon past transmission events.

Aircraft Safety And Maintenance

The ubiquitous mobile subscriber station MS can also be connected to the avionics equipment resident in the aircraft to collect data relevant to the operation of the aircraft. The data can be collected and stored in the data storage memory MEMORY for later output to an aircraft monitoring system on the ground, or the data can be transmitted to an aircraft monitoring system on the ground during an existing voice communication call, or the communication link can be automatically activated to originate a data transfer call when the ubiquitous mobile subscriber station MS is not in use. The control circuit C in the ubiquitous mobile subscriber station MS can, in well-known fashion, scan the data output terminals of the various elements of the avionics to retrieve the desired data. This enables the ubiquitous mobile subscriber station MS to function as a real-time aircraft safety and maintenance system.

As part of the communication function, the ubiquitous mobile subscriber station MS can function to receive weather maps from air weather services. The weather maps can be generated at a ground station and transmitted to the aircraft in a compact data representation, with the particular content of the weather map being a function of the data needs of the pilot. The ubiquitous mobile subscriber station MS can therefore provide frequent updates to the weather maps using the data communication capabilities noted above and can enable the pilot to revise the flight plan and receive revised weather maps commensurate with the revised flight plan.

Pilot-Controller Communications

The aircraft has an existing set of communications equipment for pilot to air traffic controller communications. The ubiquitous mobile subscriber station MS can function as a redundant communication facility to supplement these existing facilities. Alternatively, the ubiquitous mobile subscriber station MS can exclusively perform this function. Furthermore, the ubiquitous mobile subscriber station MS can add GPS aircraft position data to the information communicated to the air traffic control systems for accurate aircraft position updates. For example, if the pilot were to dial the emergency services access code ("911" in the US and "119" elsewhere) when airborne, the cellular network can automatically route the call to the nearest Air Route Traffic Control Center for processing.

Aircraft Operations Support

As also shown in FIG. 3, the ubiquitous mobile subscriber station MS can be equipped with both data processing DPD and data storage memory DS elements to thereby enable the ubiquitous mobile subscriber station MS to perform additional support functions. In particular, the data related to the flight schedule of the aircraft can be stored in the data storage memory DS and transmitted to and received from ground-based systems via the cellular communication connections established by the ubiquitous mobile subscriber station MS. The types of data can include: passenger manifest, gate departure assignments for connecting flights at the destination airport, and the like.

Value Added Services

The ubiquitous mobile subscriber station MS can provide value added communication services, such as call forwarding, call waiting, call conferencing, data call communications, caller ID, last call redial, and the like. These services are part of the existing public switched telephone network and the ubiquitous mobile subscriber station MS can be managed for call connections through this network as a traditional ground-based subscriber station.

SUMMARY

The ubiquitous mobile subscriber station automatically transitions between the communications paradigm used in ground-based cellular communications and the communications paradigm used in non-terrestrial cellular communications as a function of the present location of the ubiquitous mobile subscriber station. The subscriber therefore can use the ubiquitous mobile subscriber station in all locations for uninterrupted wireless communications services.

What is claimed is:

1. A cellular radio communication apparatus, operable both as a non-terrestrial cellular mobile subscriber station and a ground-based cellular mobile subscriber station, comprising:

first means for generating a radio frequency communication signal at one of said radio frequencies allocated for ground-based cellular mobile subscriber stations and in a mode compatible with ground-based cellular communications to communicate with a ground-based cell of a cellular communication system;

second means for generating a radio frequency communication signal at one of said radio frequencies allocated for ground-based cellular mobile subscriber stations and in a mode compatible with non-terrestrial cellular communications to communicate with a non-terrestrial cell of a cellular communication system;

means for determining a present location of said cellular radio communication apparatus;

means, responsive to said means for determining, for activating at least one of said first means for generating and said second means for generating to communicate with a corresponding cell of a cellular communication system; and means, responsive to receipt of subscriber data, for inserting said subscriber data into said radio frequency communication signal to create a composite radio frequency signal.

2. The cellular radio communication apparatus of claim 1 wherein said second means for generating comprises:

means for polarizing said composite radio frequency signal in a polarization that is substantially orthogonal to a polarization of radio frequency communication signals generated by said first means for generating.

3. The cellular radio communication apparatus of claim 1 wherein said second means for generating comprises:

means for reversing uplink and downlink functions of said generated composite radio frequency signal from radio frequency communication signals generated by said first means for generating.

4. The cellular radio communication apparatus of claim 1 wherein said second means for generating comprises:

means for offsetting transmit and receive frequencies of said generated composite radio frequency signal to be interstitial to radio frequency communication signals generated by said first means for generating.

5. The cellular radio communication apparatus of claim 1 wherein said second means for generating comprises:

means for outputting said generated composite radio frequency signal at a power that is significantly reduced from a power used by said radio frequency communication signals generated by said first means for generating.

6. The cellular radio communication apparatus of claim 1 wherein said means for inserting comprises:

means for receiving data transmitted by at least one ground-based telemetry station; and means for storing received data.

7. The cellular radio communication apparatus of claim 6 wherein said means for inserting further comprises:

means for originating a communication connection to a data collection system via said composite radio frequency signal; and means for downloading said data from said means for storing to said data collection system.

8. The cellular radio communication apparatus of claim 7 wherein said means for inserting further comprises:

means for periodically activating said means for receiving.

9. The cellular radio communication apparatus of claim 1 wherein said means for inserting comprises:

means for receiving data transmitted by at least one ground-based telemetry station;

means for originating a communication connection to a data collection system via said composite radio frequency signal; and means for downloading said data from said means for storing to said data collection system.

10. A cellular radio communication apparatus, operable both as a non-terrestrial cellular mobile subscriber station and a ground-based cellular mobile subscriber station, comprising:

first means for generating a radio frequency communication signal at one of said radio frequencies allocated for ground-based cellular mobile subscriber stations and in a mode compatible with ground-based cellular communications to communicate with a ground-based cell of a cellular communication system;

second means for generating a radio frequency communication signal at one of said radio frequencies allocated for ground-based cellular mobile subscriber stations and in a mode compatible with non-terrestrial cellular communications to communicate with a non-terrestrial cell of a cellular communication system, comprising:

means for generating a channel signal which comprises a communication space, which communication space is divided into control channels and communication channels;

means for determining a present location of said cellular radio communication apparatus;

means, responsive to said means for determining, for activating at least one of said first means for generating and said second means for generating to communicate with a corresponding cell of a cellular communication system.

11. The cellular radio communication apparatus of claim 10 wherein said means for generating a channel signal generates said control channels, which are selected to correspond to communication channels for ground-based cellular mobile subscriber stations.

12. The cellular radio communication apparatus of claim 10 further comprising:

receiver means operable to fail to decode control signals transmitted by ground-based subscriber stations in control channels for ground-based cells, which control channels for ground-based cells correspond to communication channels generated by said means for generating a channel signal.

13. The cellular radio communication apparatus of claim 10 further comprising:

receiver means operable to fail to decode control signals transmitted by ground-based subscriber stations in control channels for ground-based cells, which control channels for ground-based cells correspond to communication channels used by said non-terrestrial mobile subscriber system to communicate with said non-terrestrial cellular mobile subscriber station.

14. The cellular radio communication apparatus of claim 10 wherein said means for generating a channel signals comprises:

means for selecting said control channels to correspond to control channels for ground-based cellular mobile subscriber stations.

15. A cellular radio communication apparatus, operable both as a non-terrestrial cellular mobile subscriber station and a ground-based cellular mobile subscriber station, comprising:

first means for generating a radio frequency communication signal at one of said radio frequencies allocated for ground-based cellular mobile subscriber stations and in a mode compatible with ground-based cellular communications to communicate with a ground-based cell of a cellular communication system, comprising:

means for allocating at least one of said multiplexed signal slots exclusively for use by non-terrestrial communication stations;

second means for generating a radio frequency communication signal at one of said radio frequencies allocated for ground-based cellular mobile subscriber stations and in a mode compatible with non-terrestrial cellular communications to communicate with a non-terrestrial cell of a cellular communication system;

means for determining a present location of said cellular radio communication apparatus;

means, responsive to said means for determining, for activating at least one of said first means for generating and said second means for generating to communicate with a corresponding cell of a cellular communication system.

16. A cellular radio communication apparatus, operable both as a non-terrestrial cellular mobile subscriber station and a ground-based cellular mobile subscriber station, comprising:

first means for generating a radio frequency communication signal at one of said radio frequencies allocated for ground-based cellular mobile subscriber stations and in a mode compatible with ground-based cellular communications to communicate with a ground-based cell of a cellular communication system;

second means for generating a radio frequency communication signal at one of said radio frequencies allocated for ground-based cellular mobile subscriber stations and in a mode compatible with non-terrestrial cellular communications to communicate with a non-terrestrial cell of a cellular communication system;

means for determining a present location of said cellular radio communication apparatus;

means, responsive to said means for determining, for activating at least one of said first means for generating and said second means for generating to communicate with a corresponding cell of a cellular communication system, comprising:

means for enabling operation of said second means for generating when an aircraft in which said cellular radio communication apparatus is installed is presently in an in-flight state.

17. The cellular radio communication apparatus of claim 16 wherein said means for determining comprises:

means for determining at least one of a plurality of aircraft in-flight stated including:

pilot's activation of the aircraft landing gear, the "weight on wheels" condition when the aircraft touches down, and the aircraft's altitude above the ground level.

18. A method of operating a cellular radio communication apparatus, operable both as a non-terrestrial cellular mobile subscriber station and a ground-based cellular mobile subscriber station, comprising the steps of:

generating a first radio frequency communication signal at one of said radio frequencies allocated for ground-based cellular mobile subscriber stations and in a mode compatible with ground-based cellular communications to communicate with a ground-based cell of a cellular communication system;

generating a second radio frequency communication signal at one of said radio frequencies allocated for ground-based cellular mobile subscriber stations and in a mode compatible with non-terrestrial cellular communications to communicate with a non-terrestrial cell of a cellular communication system, comprising:

inserting, in response to receipt of subscriber data, said subscriber data into said radio frequency communication signal to create a composite radio frequency signal;

determining a present location of said cellular radio communication apparatus; and activating, in response to said determined location, at least one of said steps of generating to communicate with a corresponding cell of a cellular communication system.

19. The method of operating a cellular radio communication apparatus of claim 18 wherein said step of generating a second radio frequency signal comprises:

polarizing said composite radio frequency signal in a polarization that is substantially orthogonal to a polarization of radio frequency communication signals generated by said step of generating a first radio frequency signal.

20. The method of operating a cellular radio communication apparatus of claim 18 wherein said step of generating a second radio frequency signal comprises:

reversing uplink and downlink functions of said generated composite radio frequency signal from radio frequency communication signals generated by said step of generating a first radio frequency signal.

21. The method of operating a cellular radio communication apparatus of claim 18 wherein said step of generating a second radio frequency signal comprises:

offsetting transmit and receive frequencies of said generated composite radio frequency signal to be interstitial to radio frequency communication signals generated by said step of generating a first radio frequency signal.

22. The method of operating a cellular radio communication apparatus of claim 18 wherein said step of generating a second radio frequency signal comprises:

outputting said generated composite radio frequency signal at a power that is significantly reduced from a power used by said radio frequency communication signals generated by said step of generating a first radio frequency signal.

23. The method of operating a cellular radio communication apparatus of claim 18 wherein said step of inserting comprises:

receiving data transmitted by at least one ground-based telemetry station; and storing said received data in a memory.

24. The method of operating a cellular radio communication apparatus of claim 23 wherein said step of inserting further comprises:

originating a communication connection to a data collection system via said composite radio frequency signal; and downloading said data from said memory to said data collection system.

25. The method of operating a cellular radio communication apparatus of claim 24 wherein said step of inserting further comprises:

periodically activating said step of receiving.

26. The method of operating a cellular radio communication apparatus of claim 18 wherein said step of inserting comprises:

receiving data transmitted by at least one ground-based telemetry station;

originating a communication connection to a data collection system via said composite radio frequency signal; and downloading said data from said means for storing to said data collection system.

27. A method of operating a cellular radio communication apparatus, operable both as a non-terrestrial cellular mobile subscriber station and a ground-based cellular mobile subscriber station, comprising the steps of:

generating a first radio frequency communication signal at one of said radio frequencies allocated for ground-based cellular mobile subscriber stations and in a mode compatible with ground-based cellular communications to communicate with a ground-based cell of a cellular communication system;

generating a second radio frequency communication signal at one of said radio frequencies allocated for ground-based cellular mobile subscriber stations and in a mode compatible with non-terrestrial cellular communications to communicate with a non-terrestrial cell of a cellular communication system, comprising:

generating a channel signal which comprises a communication space, which communication space is divided into control channels and communication channels;

determining a present location of said cellular radio communication apparatus;

activating, in response to said determined location, at least one of said steps of generating to communicate with a corresponding cell of a cellular communication system.

28. The method of operating a cellular radio communication apparatus of claim 27 wherein said step of generating a channel signal generates said control channels, which are selected to correspond to communication channels for ground-based cellular mobile subscriber stations.

29. The method of operating a cellular radio communication apparatus of claim 27 further comprising:

operating a receiver in a mode to fail to decode control signals transmitted by ground-based subscriber stations in control channels for ground-based cells, which control channels for ground-based cells correspond to communication channels generated by said step of generating a channel signal.

30. The method of operating a cellular radio communication apparatus of claim 27 further comprising:

operating a receiver in a mode to fail to decode control signals transmitted by ground-based subscriber stations in control channels for ground-based cells, which control channels for ground-based cells correspond to communication channels used by said non-terrestrial mobile subscriber system to communicate with said non-terrestrial cellular mobile subscriber station.

31. The method of operating a cellular radio communication apparatus of claim 27 wherein said step of generating a channel signals comprises:

selecting said control channels to correspond to control channels for ground-based cellular mobile subscriber stations.

32. A method of operating a cellular radio communication apparatus, operable both as a non-terrestrial cellular mobile subscriber station and a ground-based cellular mobile subscriber station, comprising the steps of:

generating a first radio frequency communication signal at one of said radio frequencies allocated for ground-based cellular mobile subscriber stations and in a mode compatible with ground-based cellular communications to communicate with a ground-based cell of a cellular communication system;

generating a second radio frequency communication signal at one of said radio frequencies allocated for ground-based cellular mobile subscriber stations and in a mode compatible with non-terrestrial cellular communications to communicate with a non-terrestrial cell of a cellular communication system, comprising:

allocating at least one of said multiplexed signal slots exclusively for use by non-terrestrial communication stations;

determining a present location of said cellular radio communication apparatus;

activating, in response to said determined location, at least one of said steps of generating to communicate with a corresponding cell of a cellular communication system.

33. The method of operating a cellular radio communication apparatus of claim 34, wherein said step of determining comprises;

determining at least one of a plurality of aircraft in-flight states including: pilot's activation of the aircraft landing gear, the "weight on wheels" condition when the aircraft touches down, and the aircraft's altitude above the ground level.

34. A method of operating a cellular radio communication apparatus, operable both as a non-terrestrial cellular mobile subscriber station and a ground-based cellular mobile subscriber station, comprising the steps of:

generating a first radio frequency communication signal at one of said radio frequencies allocated for ground-based cellular mobile subscriber stations and in a mode compatible with ground-based cellular communications to communicate with a ground-based cell of a cellular communication system;

generating a second radio frequency communication signal at one of said radio frequencies allocated for ground-based cellular mobile subscriber stations and in a mode compatible with non-terrestrial cellular communications to communicate with a non-terrestrial cell of a cellular communication system;

determining a present location of said cellular radio communication apparatus;

activating, in response to said determined location, at least one of said steps of generating to communicate with a corresponding cell of a cellular communication system, comprising:

enabling operation of said step of generating a second radio frequency signal when an aircraft in which said cellular radio communication apparatus is installed is presently in an in-flight state.

* * * * *